(No Model.)　　　　　J. F. MACKENZIE.　　　4 Sheets—Sheet 1.
Aerial Navigation.
No. 235,792.　　　　　　　Patented Dec. 21, 1880.
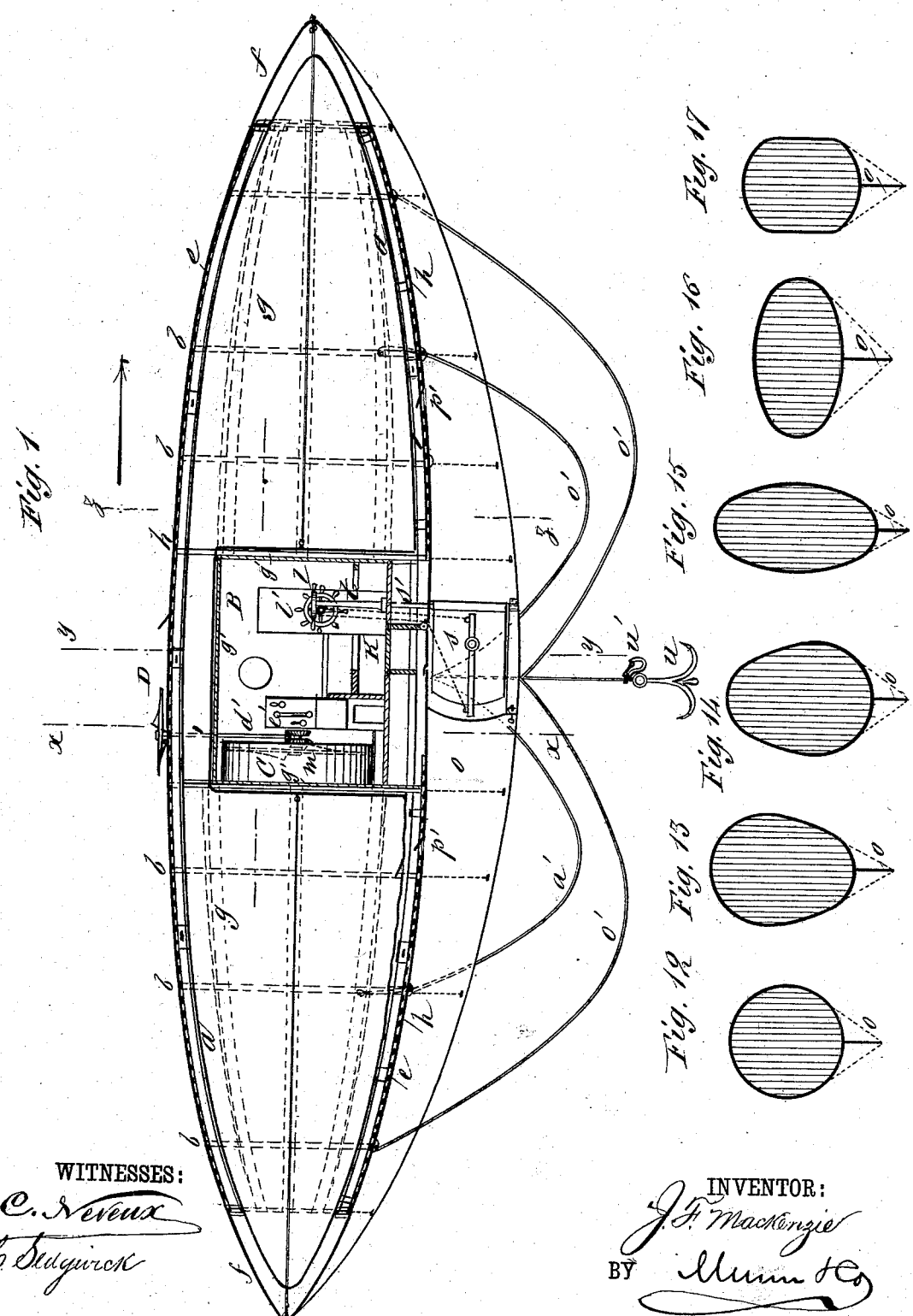
WITNESSES:
C. Neveux
T. Sedgwick
INVENTOR:
J. F. Mackenzie
BY Munn & Co
ATTORNEYS.

(No Model.) 4 Sheets—Sheet 2.
J. F. MACKENZIE.
Aerial Navigation.
No. 235,792. Patented Dec. 21, 1880.
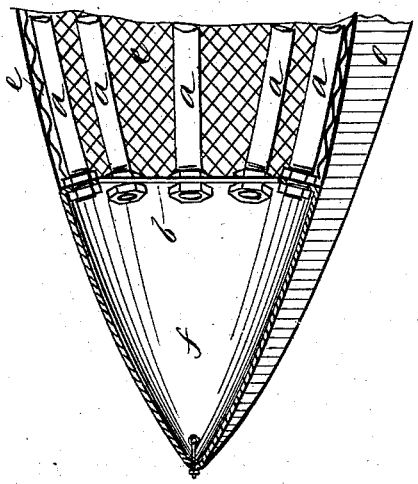
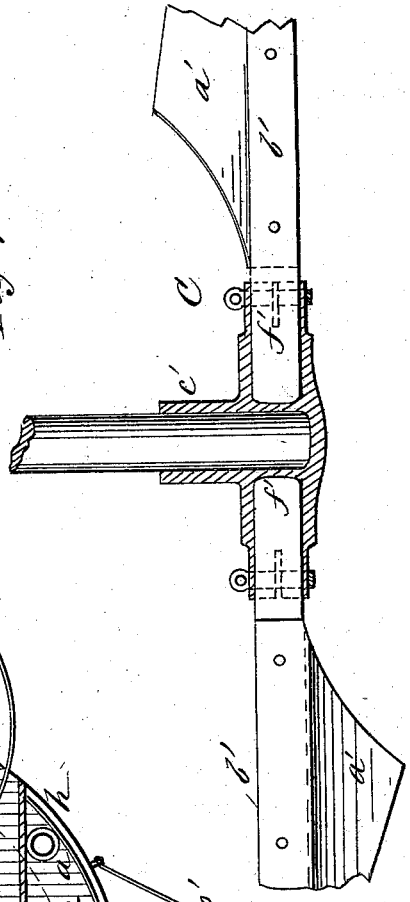
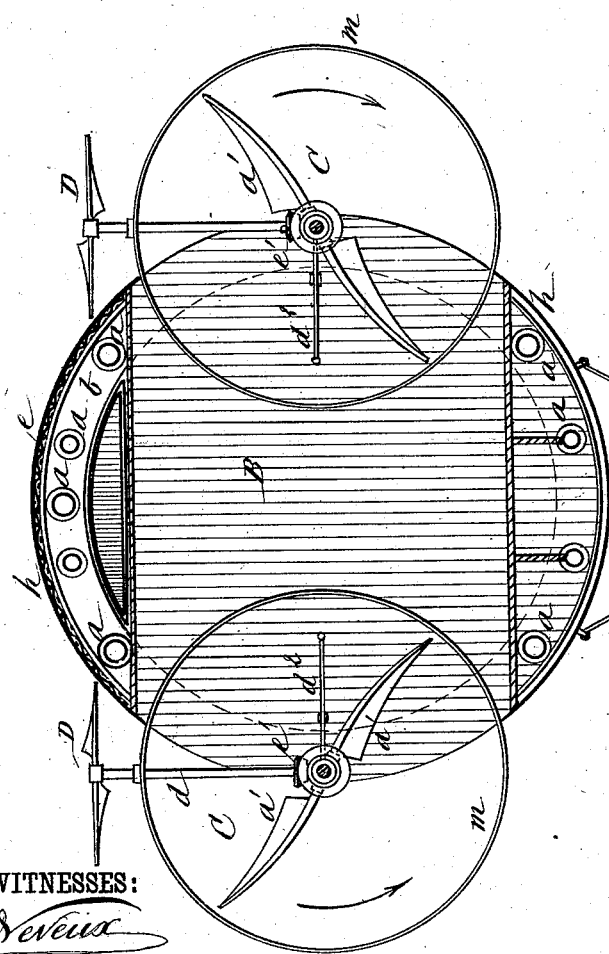
WITNESSES:
INVENTOR:

(No Model.) 4 Sheets—Sheet 3.
J. F. MACKENZIE.
Aerial Navigation.
No. 235,792. Patented Dec. 21, 1880.
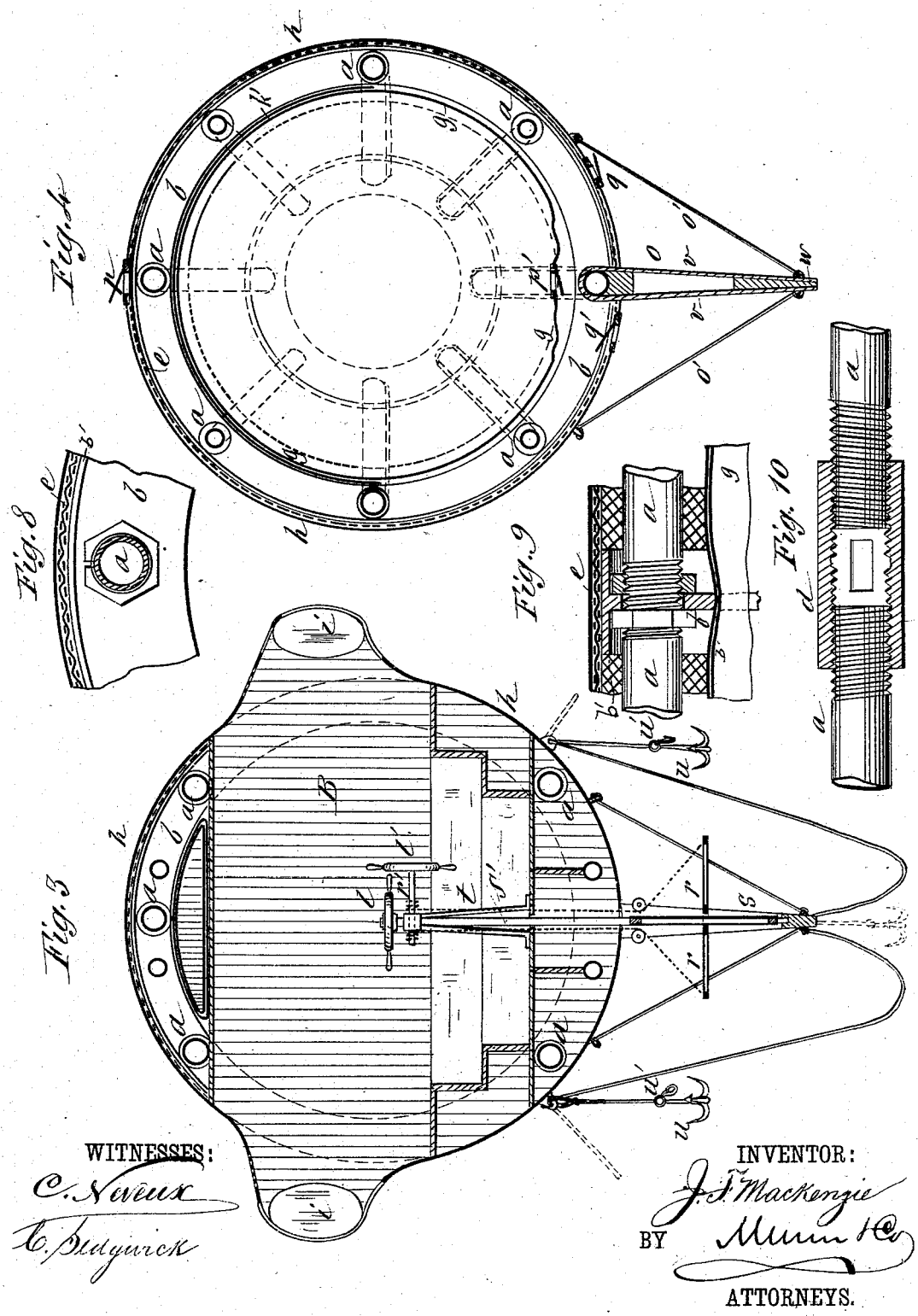

(No Model.)  
J. F. MACKENZIE.  
Aerial Navigation.  
No. 235,792. Patented Dec. 21, 1880.
4 Sheets—Sheet 4.
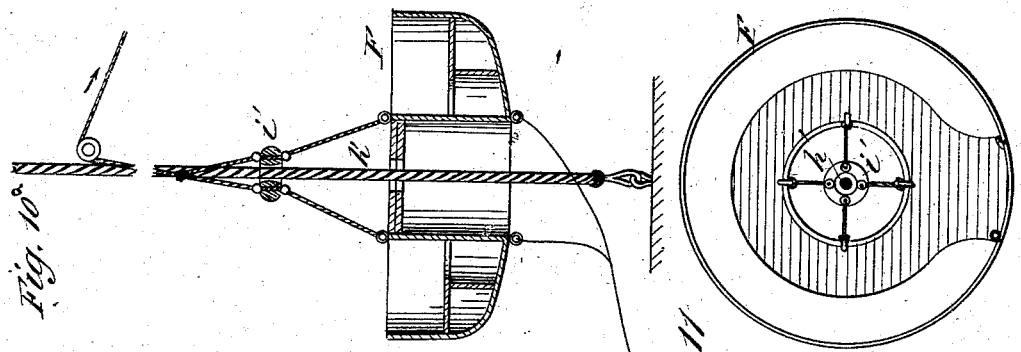
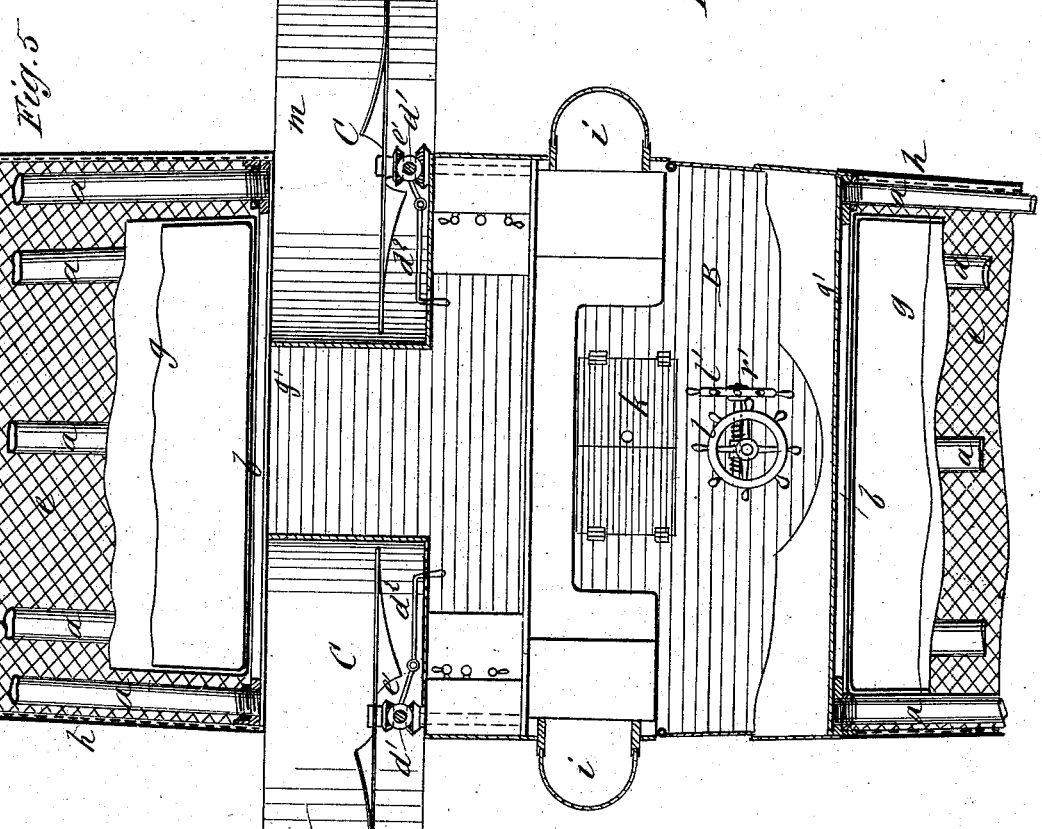
WITNESSES:
C. Neveux
C. Sedgwick
INVENTOR:
J. F. Mackenzie
BY Munn & Co.
ATTORNEYS.

UNITED STATES PATENT OFFICE.

JOHN F. MACKENZIE, OF EDINBURGH, SCOTLAND.

AERIAL NAVIGATION.

SPECIFICATION forming part of Letters Patent No. 235,792, dated December 21, 1880.

Application filed October 13, 1880. (No model.)

*To all whom it may concern:*

Be it known that I, JOHN FINLAYSON MACKENZIE, of Edinburgh, Scotland, have invented a new and Improved Method of Constructing, Propelling, and otherwise Maneuvering Buoyant Vessels in the Atmosphere, of which the following is a specification.

My improvements relate to aerial locomotives or vessels for navigating the air, and have for their object to furnish a machine that can be driven at the desired speed in any direction and will be under perfect control.

The invention consists in certain features of construction and arrangement, which will be set forth in detail hereinafter, with reference to the accompanying drawings, forming part of this specification.

In the drawings, Figure 1 is a side view of the vessel. Fig. 2 is a vertical cross-section on line $x\,x$ of Fig. 1. Fig. 3 is a vertical cross-section on line $y\,y$ of Fig. 1. Fig. 4 is a cross-section on line $z\,z$. Fig. 5 is a sectional plan view of the center portion of the vessel. Fig. 6 is a longitudinal section, showing one end of the vessel. Fig. 7 is a section of one propeller in the form I prefer. Figs. 8 to 11, inclusive, are detail views. Figs. 12 to 17 are views representing modifications of the cross-sectional shape of the vessel.

Similar letters of reference indicate corresponding parts.

The vessel, as shown in Fig. 1, is of elongated form—that is to say, the length is to be several times the diameter, preferably not less than six times. As shown in the drawings, the shape in longitudinal section is that of two lanceolated figures placed base to base, forming a spindle-shaped body when the cross-sections are circular; but it may be elliptical or otherwise shaped in cross-section, as illustrated by the Figs. 12 to 17. I prefer, however, in single vessels, as distinguished from double and triple vessels, to have the cross-section taken at any place circular, as that shape combines the essentials of stability and maximum buoyancy with least resistance.

The machine must have a rigid shell to enable it to withstand external and internal pressure, as well as to sustain the weight of machinery and other load. As combining the greatest strength with lightness and cheapness, I construct the skeleton of steel tubes, (shown at $a$,) and forming longitudinal ribs of a thickness and diameter proportioned to the weight they have to sustain. These tubes are to be circular, oval, or other form in cross-section, and are held in place by flat rings $b$, of metal, through which the tubes pass, either smoothly and secured by flanges and nuts to make a rigid connection, or they may be clamped by nuts, as shown in Figs. 8 and 9. The tubes may be in lengths and of varying section in size, or each length may gradually decrease in diameter toward the extremities of the vessel, so that the ends can be screwed together. In case the ends correspond in size, or nearly so, they may be connected together, as shown in Fig. 10, by a right-and-left-hand screw-sleeve, $d$.

The tubes $a$ in the lower portion of the frame will preferably be of larger diameter than those in the upper part, as illustrated by dotted lines in Fig. 4, for the reason that more strength is required at the lower sides of the vessel, and also to maintain the center of gravity below the longitudinal axis of the vessel. The tubes will be covered with paper, pith, or other non-conducting material, to prevent radiation of heat and expansion of the gas thereby. I remark that all metals used in the vessel should be similarly protected. In small-sized vessels the spaces between these tubes will be covered or filled with wicker-work, netting, or other light, tough, and flexible material, for the purpose of distributing the external and internal pressure. This covering material is shown at $e$. In larger machines sheet metal may be substituted, the same having its pores filled by a coat of varnish, paint, or other suitable material; to render the material impermeable to gas or air. Sheet metal will be used only when the machine has the necessary surplus buoyancy.

The basket-work is to be attached, by twine, wire, or other simple devices, to perforated flanges on the rings $b$.

The ends of the frame-work should be exceptionally stiff to withstand pressure when the vessel is suddenly started or stopped. I prefer to form the conical ends by using a shoe or cone, (shown at $f$ in Fig. 6,) to which shoe $a$ is connected in any suitable manner with the end ring, $b$.

The gas for giving buoyancy will be contained in an envelope of varnished silk or other material, as usually employed in the construction of balloons. This envelope (shown at g, Figs. 1 and 4) is placed inside the skeleton-frame and secured in place by cords or similar devices. Outside the skeleton-frame is stretched a similar fabric, (shown at h,) which may be of coarser and cheaper material. In the event of sheet metal being used, as before mentioned, the outer and possibly both fabrics may be dispensed with if the metal is sufficiently impermeable. The fabrics may be also in one or more layers.

Between the upper surface of the envelope g and the ribs a, I insert a soft fabric, as shown at k', Fig. 4. This is to prevent the envelope from chafing or becoming otherwise injured by contact with the tubes. As the pressure is at the upper side of the envelope, this protection is needed only at that portion.

The envelope g being at the inner side of the tubes and the shell h at the outer side, there is consequently an annular space between the two surfaces. This space contains air more or less mixed with gas from the gas-receptacle, which serves as a non-conducting covering to prevent the gas in the envelope becoming expanded.

All materials used should be properly treated to render them non-inflammable by any suitable preparation, and also with preservative compounds to prevent rapid decay.

The gas-receptacle may be single, with the envelope fitting closely within the skeleton, or it may be divided by gas-tight partitions into compartments. In case horizontal or vertical braces are used for the vessel, there will be several gas-envelopes, properly placed according to the braces. When the compartment or car for containing the machinery and load is at the center of the vessel the gas-envelopes will be placed at each end of the vessel, and either cut off or in connection with each other.

B is the car or compartment for containing the engines, passengers, and freight. This I have shown as placed at the mid-length of the vessel, which position I prefer in small vessels, for the reason that the skeleton can be made lighter than when it has to sustain a load at each end. The compartment B is formed by plates g', of sheet metal, which are attached in any suitable manner to the ribs a, so that the inclosed space is entirely cut off from the other part of the vessel.

The car is to be suitably arranged for carrying passengers, freight, and ballast, the latter being preferably placed below the center line of resistance. The space for engines will be cut off from the passenger-space and all other portions of the vessel by a sheet-metal partition, as a security against fire. In the opposite sides of the compartment B are ports for lookouts i, which project so that observations may be made in every direction, and lights placed at night to indicate direction, in a manner similar to the lights used on aquatic vessels. In the bottom of compartment B is fitted a trap-door, k, for ingress and egress, and the car also contains the steering-wheels l l', hereinafter described. I prefer to use screw-propellers, as most effective for the purpose. These, as shown at C, are placed at about the mid-length of the vessel within cylinders m, and with their axis in line with the sides of the vessel, or nearly so. They may, however, be placed at the ends of the vessel, and in that position would have advantage as regards length of blade and freedom of action; but the two long shafts required in that case would be a disadvantage in respect to weight.

The form of blades is shown most clearly in Fig. 7, in which a' a' are the blades, secured upon flexible arms b' by screws that are fixed in the sockets of a hub, c'. The length may be varied; but I prefer to use long blades moving slowly rather than short blades revolved rapidly. I prefer to form them tapering, with their heels cut away to form an arc having a radius a little less than the width of the blade. The flexible arms permit the blade to assume a pitch proportioned to the resistance in case the proper pitch has not been adopted.

The inner ends of arms b' consist of steel tubes f', slit in one or more places and held to the hub c' by screw-collars, so that the propellers can be adjusted as required. The flexible arms may be of any suitable material. Bundles of cane of tapering form and bound by wire furnish the required flexibility without risk of breakage.

The propellers C are fitted for revolution in a vertical plane, or at right angles to the longitudinal axis of the vessel. In addition to these I use auxiliary propellers D, fitted above the main propellers on vertical shafts d', for revolution in horizontal planes, or at right angles to the planes of propellers C. The shafts d' are fitted in suitable bearings, and are provided with bevel-gears e', meshing with similar gears on the shafts of propellers C. The shafts are also fitted for being swung to throw the gears in and out of contact, and levers d² provided for moving them as required. These auxiliary propellers are for use in elevating and depressing the vessel to avoid a storm or an unfavorable current of air.

I remark here that it is not intended for the vessel to descend in contact with the earth at any time, except for repairs, and for this reason some means must be provided for readily changing the elevation, and in addition, or in place of using the propellers D, the simple though crude method can be adopted of discharging ballast or gas; or I may use a rudder placed horizontally and capable of movement in a vertical plane.

I prefer to use a pair of oscillating revolving engines connected separately with propellers C as the motor. These are to be contained within the car, in a separate compartment, as mentioned, and connected with the shaft or shafts of the propellers C. I also prefer to use as fuel liquid hydrocarbons, sufficient air being supplied by a blower or otherwise to secure perfect combustion.

When blowing mechanism is not provided the casing of the furnace will be formed with openings to admit air as required, and these should be covered with fine wire-gauze to cut off flame and prevent accidents by fire.

All valves will be similarly furnished as shown in connection with valves $p\ q\ q$ in Fig. 4, and in the full feed a bundle of wires will be inserted for a similar purpose, thus guarding against the possibility of an explosion by fire being communicated to the escaping gas.

The gas-envelope is provided with an opening and valve, $p'$, at the bottom, as shown in Fig. 4, for the escape of gas to the space between the envelope and outer shell; but the final escape to the outer air will be by an opening at the upper side of the vessel. This outlet is fitted with valves $p$, opening outward, so that when the vessel is rising the air-pressure will tend to keep the valves closed until the external pressure becomes excessive. To permit relief and prevent rending of the envelope, I provide one or more valves, $q$, at the bottom, which open outward and are loaded, so as to open automatically when the pressure exceeds the safe point. A second set of valves, $q'$, at the bottom and opening inward allows ingress of air to replace the gas escaping by the upper valve, $p$. I prefer to use valves of conical form provided with spiral springs adjustable by screws to regulate the pressure.

For the purpose of steadying and stiffening the vessel a keel, $o$, consisting of a thin web of material, is attached to the under side of the vessel, extending the whole length, or nearly so. This keel will also assist in keeping the center of gravity low, especially if the greatest depth be at the center, as shown. The keel $o$ may consist of two thin sheets, $v$, of steel, secured to the lower tube, $a$, and depending therefrom parallel or inclined, and connected to block $w$ at the lower edge, as shown in Fig. 4. To render the keel more rigid, stays $o'$, of wire rope or some suitable material, will be used.

As shown in Figs. 1 and 3, rudders $r\ s$, for steering the vessel, are placed at the center of the keel. The rudder $s$ is upon a shaft, $s'$, that extends up through a post, $t$, in car B, the upper end carrying hand-wheel $l$, whereby the rudder may be turned in a horizontal plane to change direction of the vessel. The rudder $r$ extends at both sides of rudder $s$, and is hung thereon to swing in a vertical plane. From rudder $r$ ropes pass to a shaft, $r'$, that is fitted in a horizontal position on post $t$. The hand-wheel is on shaft $r'$, and by these means the rudder $r$, while carried by rudders $s$, can be inclined to change the direction of the vessel up or down.

The balance of the vessel should be obtained by making all duplicate parts as nearly as possible alike in weight and placing them equidistant from the center. If the balance is likely to be disturbed, shifting ballast or a pendulum may be used. If the vessel have a tendency to tilt in either direction, either or both rudders can be set at an angle to obviate such tendency.

At $u$ are shown anchors for use in holding the vessel. There may be three or more of these placed at suitable places, so that the vessel can be held securely and in any direction, as desired, and passengers safely embarked or disembarked. The anchor-ropes are provided also with hooks $u'$, which have spring-tongues, similar to safety-hooks, to prevent their disconnection. The hooks are for use in place of the anchors at regular landings, where rings are provided for their connection. Five anchors are shown in the drawings.

An ordinary rope ladder may be used by the passengers, such ladder to be secured to the ground and to the side or bottom of the vessel.

I prefer to use a basket, F, as shown in Figs. 10$^a$ and 11, which will be suspended from the hatchway or side doors by ropes working through pulleys, and the basket fitted with a central opening and guide, $i'$, to move on a rope, $h'$, connected to the ground; or the anchor-rope may be utilized for the purpose.

Instead of the single vessel shown, two or more of these may be placed side by side, but separated and connected by light and stiff platforms. Such construction would insure steadiness, and is adapted for use when it is desired to have the vessel take to land or water.

I do not limit myself to the shape shown for the vessel, either longitudinally or cross-sectionally.

Having thus described my invention, I claim as new and desire to secure by Letters Patent—

1. In vessels for navigating the air, the flat metallic rings $b$, adapted for supporting the tubes $a$, and having perforated flanges on their sides for attaching the basket-work, &c., substantially as described.

2. In vessels for navigating the air, the combination of the automatic valves, consisting of valve $p'$ on the lower side of the gas-envelope, for the purpose of preventing a collapse by a too rapid escape of gas, and the alternately-operating valves $p$ and $q$ in the outer shell, for providing a safe conduct of explosive mixtures to the outer air, arranged and operating substantially as described.

3. In vessels for navigating the air, the vertical propellers C, substantially as described, having their axes in line with the sides of the vessel, and capable of acting independently of the horizontal propellers D by mechanism placed entirely within the car, for the sake of compactness of arrangement, substantially as set forth.

4. In vessels for navigating the air, the propellers C, consisting of blades fixed upon flexible arms, substantially as shown and described.

5. In propellers for air-vessels, the tapering blades $a'$, having their heels curved, as and for the purpose set forth.

6. In propellers for air-vessels, the split tubes $f'$ and clamping-rings, combined with arms $b'$ and hub $c'$, substantially as and for the purpose set forth.

7. In vessels for navigating the air, the keel or web $o$, formed with its deepest portion at the mid-length of the vessel, for the purpose of keeping the center of gravity low, substantially as set forth.

8. The web or keel formed of plates $v\ v$ and blocks $w$, combined with the buoyant vessel of oblong form, substantially as shown and described.

9. The stays $o'$, combined with the keel $o$ and buoyant air-vessel, substantially as and for the purposes set forth.

10. In vessels for navigating the air, the rudder $s$, hung on a vertical axis midway within the keel, and forming part thereof, and manipulated substantially as shown and described.

11. The rudder $r$, hung on rudder $s$ to swing in vertical plane, and with the rudder $s$, combined with the buoyant air-vessel, having mechanism for separate manipulation of the rudders, substantially as described and shown.

12. The combination, with buoyant vessels for navigating the air, of anchors $u$, provided with safety-hook $w'$, substantially as and for the purpose set forth.

13. In vessels for navigating the air, the interior car, B, provided with side projections or lookouts, $i$, as shown and described.

14. In vessels for navigating the air, the auxiliary propellers D, provided with levers $d^2$, for moving them as required, substantially as and for the purpose described.

15. In vessels for navigating the air, the combination of two reversing oscillating engines, placed side by side, with the driving-propellers, substantially as specified.

JOHN F. MACKENZIE.

Witnesses:
ANNE MACKENZIE,
JESSIE MACKENZIE.